Aug. 4, 1936. B. W. I. WORRALL 2,049,484
VALVE SPRING LIFTER
Filed Nov. 1, 1934 2 Sheets-Sheet 2
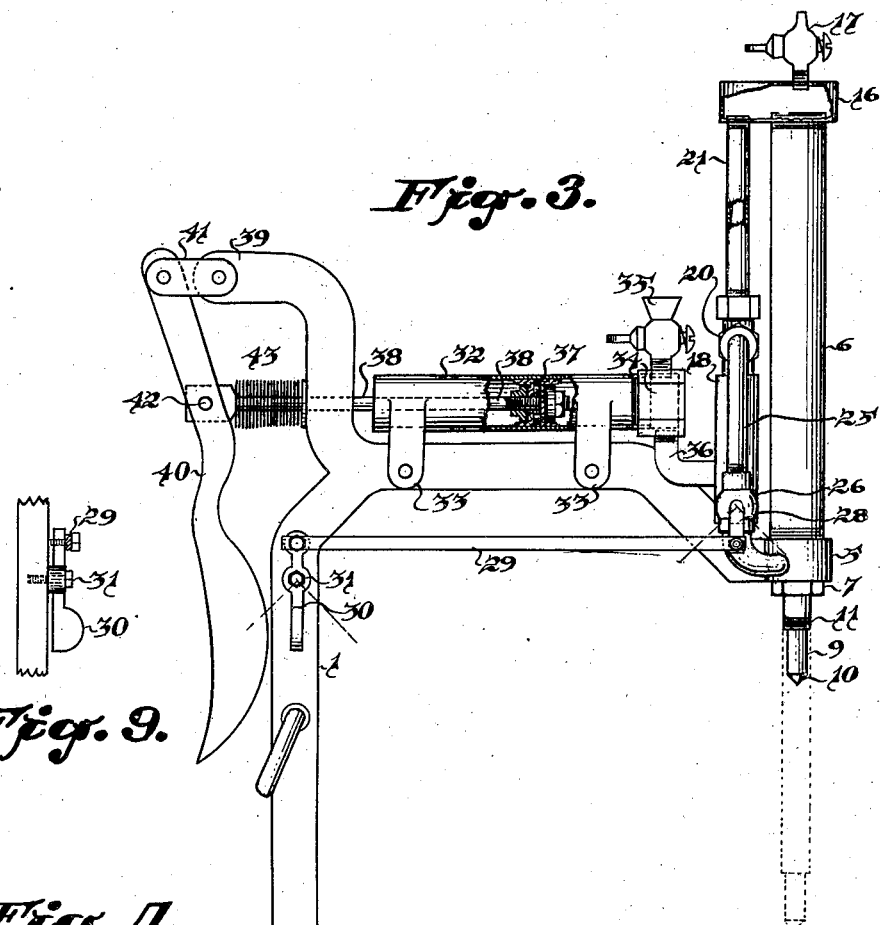
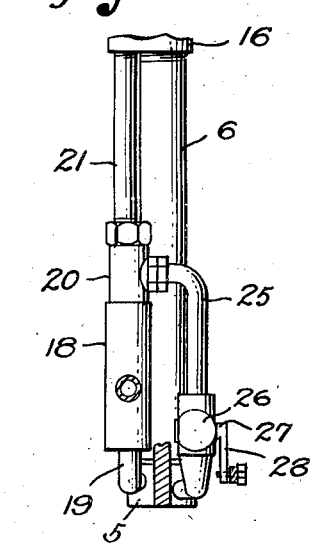

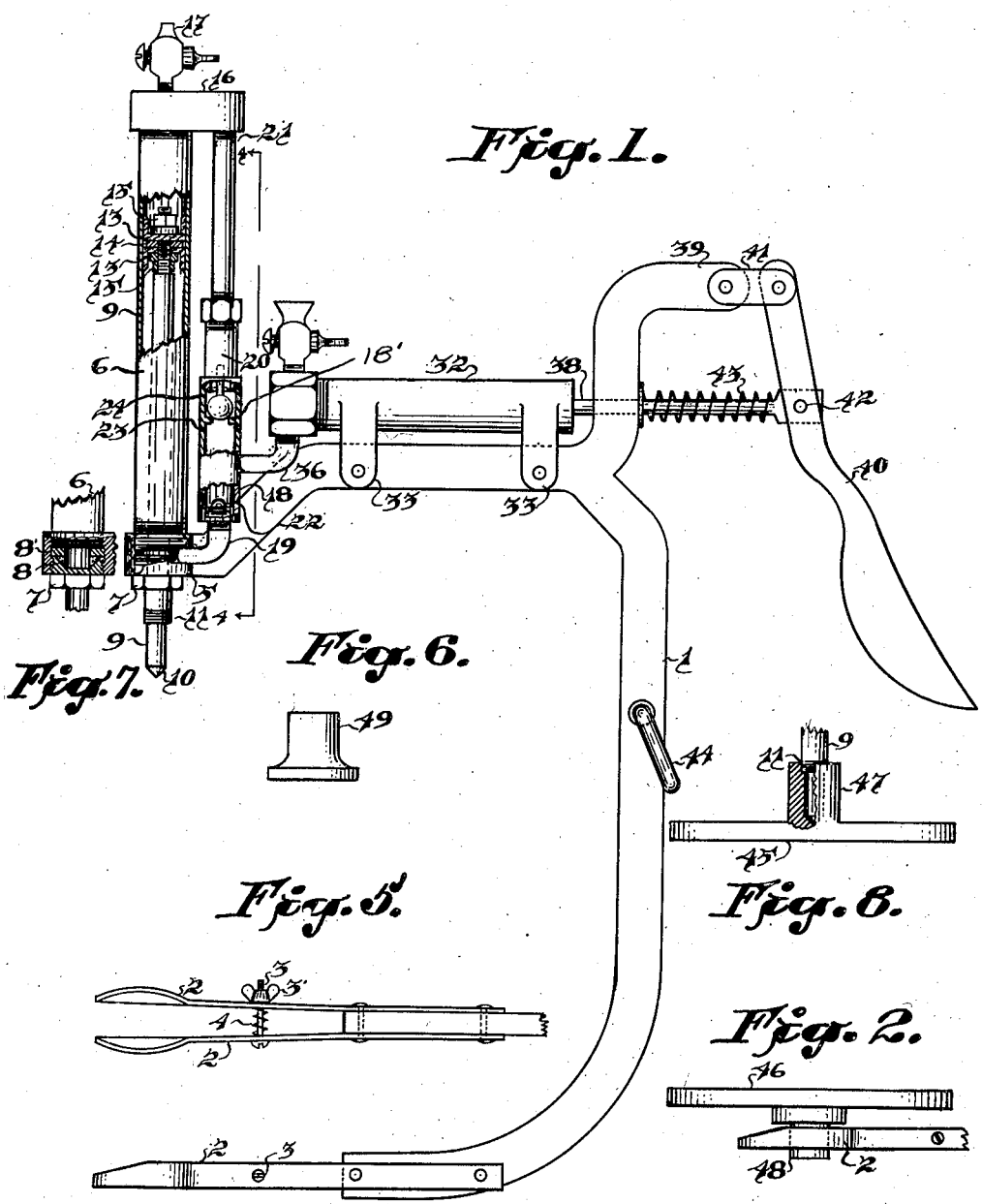

Patented Aug. 4, 1936

2,049,484

UNITED STATES PATENT OFFICE 2,049,484

VALVE SPRING LIFTER

B. Walter Ivan Worrall, Davidson, Saskatchewan, Canada, assignor of one-half to William Hugh Howie, Davidson, Saskatchewan, Canada Application November 1, 1934, Serial No. 750,957

4 Claims. (Cl. 29—86.3)

My invention relates to valve spring lifters, and more particularly to a tool designed for holding the valve head and raising the valve spring in a single operation.

One of the objects of my invention is to provide a valve spring lifter for motor engines embodying therein elements arranged to simultaneously hold the valve head and raise the valve spring to permit removal of the collar retaining key from the valve stem.

The essential features of my invention comprise a yoke carrying at one end jaws for engagement with the valve spring to be lifted, and at the other end a movable spindle arranged to be actuated by fluid under pressure and adapted by engagement with the valve stem to effect movement of the yoke for elevation of the valve spring.

An additional feature of my invention is the provision for accessories for conversion of the lifter into a clamp for various useful purposes.

Other advantages of my invention will become apparent from the accompanying description taken in conjunction with the drawings which constitute a part of this application, and in which:—

Fig. 1 is a side view in elevation of the device assembled; shown partly sectioned to disclose certain parts.

Fig. 2 shows a side view of the lower plate for conversion of the tool into a clamp, the same being shown supported on the lifter jaws.

Fig. 3 is a side view of the device assembled, the view being opposite to that shown in Figure 1.

Fig. 4 is a view of the main cylinder and valve housing compartment illustrated as taken on a line 4—4 of Figure 1.

Fig. 5 is a plan view showing the jaws.

Fig. 6 shows a separate attachment for use in conversion of the tool to a clamp.

Fig. 7 shows a detail view in section of the lower portion of the main cylinder.

Fig. 8 shows a side view of the upper plate for conversion of the tool into a clamp, the same being shown partly sectioned and in engagement with a fragment of the spindle.

Fig. 9 shows a detail view of a fragment of the yoke with drainage connection valve rod handle.

Having reference to the drawings the device includes a yoke 1 carrying at the one end companion jaws 2—2, said jaws being adjustably held in spaced relation by a bolt 3 with winged nut 3¹ and spring 4 interposed between the jaws.

The other end of the yoke 1 carries an internally threaded boss 5 having threaded therein a main cylinder 6 and a plug or packing gland 7 between which a packing ring 8 of compressible material is interposed together with washer 8¹. The plug 7 is centrally bored for sliding reception of a spindle 9, said spindle having a conical contact point 10 and a threaded shoulder portion 11 for attachment of accessories.

The upper end of spindle 9 carries a head formed of piston rings 13—13, of leather or similar material, spaced by a washer 14 and secured between nuts 15—15 threaded on said spindle.

The upper end of cylinder 6 is closed by a head 16 having a drainage outlet cock 17.

Accessory to the cylinder 6 is a valve housing compartment 18 communicating with said cylinder at its lower end through an elbow 19 threadably engaged with said housing compartment and the boss 5. The upper end of the compartment 18 communicates through a nipple 20 and pipe 21 with the cylinder head 16.

The end of the elbow 19, within the compartment 18, provides a seat for a ball valve 22, while the upper end of said compartment is closable by a valve 23 having a spindle 24 slidable in the nipple 20, said valve being adapted to seat on an annular shoulder 18' formed in the chamber 18.

Between the valve housing compartment and main cylinder is a drainage connection 25 communicating between the nipple 20 and boss 5. Said drainage connection is provided with a pet cock 26 including an operating stem 27 with arm 28 for actuation by a rod 29. Said rod 29 is pivotally connected to a handle 30 which is pivoted at 31 to the yoke 1.

On the yoke 1 is supported a fluid compressor, which compresses a cylinder 32 closed at the one end and secured on the yoke 1 by integral legs or bracket members 33.

The cylinder 32 has its open end closed by a head 34 threaded thereon, said head having an inlet cock 35. The head 34 communicates with the valve housing compartment by an elbow 36.

Within the cylinder 32 is mounted to reciprocate a piston 37 with rod 38 slidable in a suitable opening formed in the closed end of said cylinder.

The yoke 1 is provided with a lateral arm 39 having a hand lever 40 in pivotal connection therewith by links 41. The rod 38 connects by a pin 42 with the hand lever 40, said rod 38 having an open spring 43 between said hand lever and arm 39.

On the yoke 1 is a link 44 for engagement of the hand lever 40 to hold said lever in a forward position.

In the operation of the device, the jaws 2—2 are inserted under the valve spring to be lifted, said jaws being spaced from the valve stem. The contact point 10 of spindle 9 is engaged against an indentation normally provided in valve heads. With the pressure cylinder 32 filled with a suitable fluid it is merely necessary to press down on hand lever 40 to force fluid through the valve housing compartment 18, nipple 20, pipe 21 and head 16 into the cylinder 6, said fluid impinging on the head of the spindle 9. Said spindle being relatively immovable, operation of the fluid causes the yoke 1 to raise and simultaneously lift the engaged valve spring.

Valve 23 would normally gravitate into a seated or closing relation with respect to the upper outlet from chamber 18 and would be unseated by pressure of the fluid when the hand lever 40 was operated, to allow passage of the fluid through the upper outlet from the chamber 18. Upon release of such pressure said valve would gravitate into closing relation with respect to the chamber outlet. To secure a positive operation of the valve 23 a spring could be applied on the nipple 24 adjusted to hold the valve normally against its seat 18'. Fluid within the cylinder 6 below the piston head escapes by way of the opening normally closed by the ball valve 22.

With the valve spring lifted the hand lever 40 can be engaged by the link 44. In releasing the hand lever 40 the pet cock 26 would be opened by manipulation of the handle 30 allowing the fluid to drain from the upper part of the cylinder 6 into the lower portion thereof to be drawn into the pressure cylinder 32.

The tool is readily convertible into a clamp for various useful purposes by addition of accessory attachments. In Figure 2, plates 45 and 46 are shown for use in vulcanizing and like purposes. The plate 45 has a head 47 adapted for threaded engagement with the shoulder portion 11 of the spindle 9, while the plate 46 is provided with a stem 48 engageable between the jaws 2—2. Said plates provide suitable surfaces between which the material to be vulcanized can be clamped.

In addition there is shown in Figure 6 a plug 49 adapted to be threaded on the spindle 9 to provide a contact member for clamping purposes, such as the clamping of boards that are being glued together.

From the foregoing taken in conjunction with the drawings the advantages of the tool will be understood but though specific details of construction have been shown for illustrative purposes, numerous changes may be made within the scope of the invention as claimed.

What I claim is:—

1. In a fluid pressure valve-spring lifting device including a yoke and a cylinder on the yoke with piston mounted for reciprocation therein, an accessory valve housing compartment having outlets communicating with opposite extremities of the cylinder, and a fluid pressure device having communication with said compartment, said device including a pressure cylinder separately carried by the yoke, a piston mounted to reciprocate within the cylinder, a piston rod connected therewith, a hand lever connected for actuation of said rod, said yoke including a lateral arm on which the hand lever is pivoted, and spring means normally holding said lever with the piston withdrawn within the cylinder.

2. A valve-spring lifting device comprising a yoke, means carried by one end of the yoke for engagement with a valve spring, a cylinder carried by the other end of the yoke, a piston mounted for reciprocation within the cylinder, said piston having connected thereto a spindle engageable with a valve head, an accessory valve housing compartment having outlets communicating with opposite extremities of the cylinder, valve means for said outlets, a drainage connection between extremities of the cylinder, and a manually operable fluid pressure device separately carried by the yoke, said device having communication with the valve housing compartment.

3. A valve-spring lifting device comprising a yoke, means carried by one end of the yoke for engagement with a valve spring, a cylinder on the yoke with piston mounted for reciprocation therein, said piston having a valve engaging spindle connected therewith, a valve housing compartment in communication with extremities of the cylinder, valve means for said compartment, a manually operable device for supplying fluid under pressure to the cylinder for actuation of the piston, said device being connected to the valve housing compartment, spring means on the fluid pressure device normally holding said device with the pressure released, and a drainage connection for withdrawal of fluid from the cylinder to the fluid pressure device.

4. A valve-spring lifting device comprising a yoke, means carried by one end of the yoke for engagement with a valve spring, a boss carried by the other end of the yoke, a cylinder threaded in the boss, a piston mounted for reciprocation in the cylinder, said piston having a valve engaging spindle connected therewith, said spindle being slidable in the boss, a head on the cylinder, a valve housing compartment having direct communication with the cylinder head and lower end of the cylinder, a manually operable fluid pressure device separately carried by the yoke, said device having communication with the valve housing compartment, and a drainage connection between the opposite extremities of the cylinder.

B. WALTER IVAN WORRALL.